Jan. 4, 1966 R. B. PITTMAN 3,227,910
KINESCOPE SOCKET

Filed May 9, 1961 3 Sheets-Sheet 1

INVENTOR.
ROBERT B. PITTMAN
BY *James and Franklin*
ATTORNEYS

Jan. 4, 1966 R. B. PITTMAN 3,227,910
KINESCOPE SOCKET

Filed May 9, 1961 3 Sheets-Sheet 2

INVENTOR.
ROBERT B. PITTMAN

BY James and Franklin
ATTORNEYS

Jan. 4, 1966    R. B. PITTMAN    3,227,910
KINESCOPE SOCKET

Filed May 9, 1961    3 Sheets-Sheet 3

INVENTOR.
ROBERT B. PITTMAN
BY James and Franklin
ATTORNEYS

United States Patent Office 3,227,910
Patented Jan. 4, 1966

3,227,910
KINESCOPE SOCKET
Robert B. Pittman, River Edge, N.J., assignor to Industrial Electronic Hardware Corp., New York, N.Y., a corporation of New York
Filed May 9, 1961, Ser. No. 122,048
7 Claims. (Cl. 313—318)

This invention relates to kinescope sockets, and more particularly to such a socket provided with "blow-out" protection means.

The invention is applicable to cathode ray oscilloscope tubes in general, and most commonly to kinescope or television picture tubes. For convenience the term "kinescope is here used, but without intending to exclude other cathode ray tubes. The tubes terminate in a ring of pins, which in turn receive a socket. The typical socket comprises an insulation body carrying a ring of metal contacts each having a pin grip. These provide connection to the tube pins which in turn lead to the various electrodes inside the tube such as the cathode and the grids of the kinescope. A typical tube operating with a high voltage on the screen may have a much lower voltage on other electrodes, such as the focusing electrode and the accelerator electrode. These lower potentials are obtained from a voltage divider.

By reason of fault in the divider or elsewhere the said electrodes may be subjected to a much higher voltage, with consequent injury to the kinescope tube. Protective resistors have been used in an effort to protect the tube but they have not worked satisfactorily, and when successful require a servicing job to replace the resistor, apart from servicing the faulty power supply.

The general object of the present invention is to provide improved means to protect parts of the kinescope tube against excessive voltage. A more specific object is to provide such a means which is self-restoring. This is done by the provision of a spark gap to ground, which gap is not affected by normal voltage, but which is bridged and serves to ground an excessive voltage. Another object is to provide such a spark gap or gaps within the kinescope socket itself, so that no extra wiring and additional components are required. A still further object is to do this without significant enlargement of the socket.

To accomplish the foregoing general objects, and other more specific objects which will hereinafter appear, my invention resides in the socket and spark gap elements and their relation one to another, as are hereinafter more particularly described in the following specification. The specification is accompanied by drawings in which.

Figure 3:
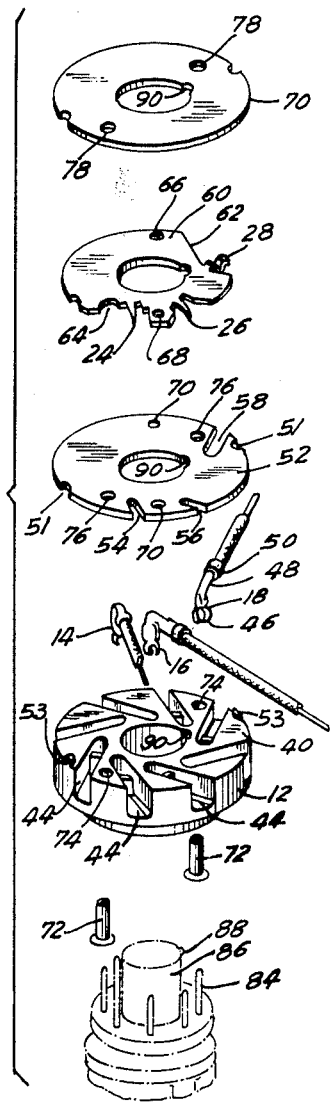
FIG. 3 is an exploded view showing the parts of the socket and their relation to a kinescope tube.
Figure 4:
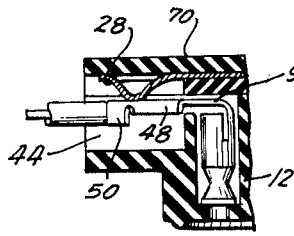
FIG. 4 is a fragmentary section drawn to enlarged scale and showing a bent finger which provides a ground contact.
Figure 5:
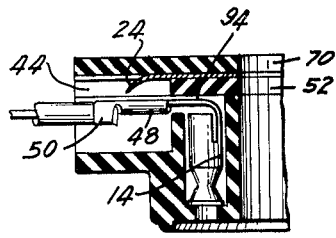
FIG. 5 is a fragmentary section drawn to like scale and showing one of the spark gaps.

Referring to the drawing, and more particularly to FIG. 3, the kinescope socket comprises an insulation body 12, and metal contacts only three of which are shown, marked 14, 16, and 18. One contact, in this case the contact 18, is for a ground connection. There is also a spark gap electrode 24 (or 26) near one of the other contacts for protective cooperation therewith. This is best shown in FIG. 5. There is also a means or bent finger 28 for connecting the spark gap electrodes 24 and 26 to the ground contact 18. This is best shown in FIG. 4. In the usual case, the contacts 14 and 16 are for connection to the pins leading to the focusing grid and the accelerator grid in the tube.

Figure 8:
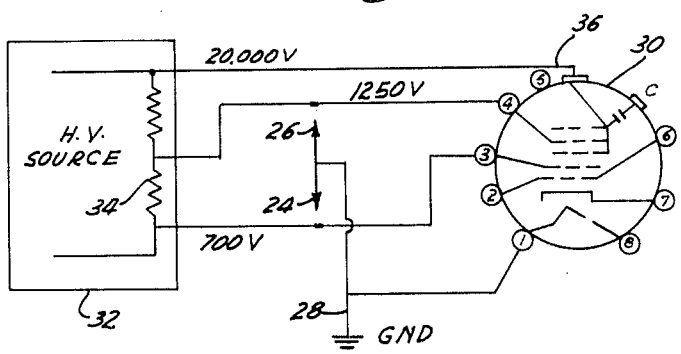
FIG. 8 is an explanatory schematic diagram.
Figure 10:
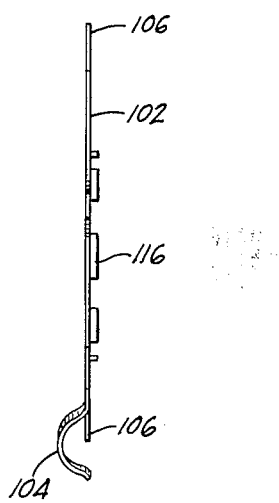
FIG. 10 is an edge view thereof.

The effect of this arrangement may be explained with reference to FIG. 8, in which the kinescope 30 terminates in a ring of pins numbered 1 through 8, as shown. There is a high voltage source 32 which includes a voltage divider part of which is shown at 34. The voltage supplied to the screen at 36 may be quite high, say, 20,000 volts. The voltage supplied to the accelerating grid at pin 4 may be 1250 volts, and that supplied to the focusing grid at terminal 3 may be 700 volts. The protective spark gaps are indicated at 24 and 26, with a ground connection at 28. It will be evident that excessive voltage will causing arcing and thus be relieved by flow directly to the ground.

Figure 1:
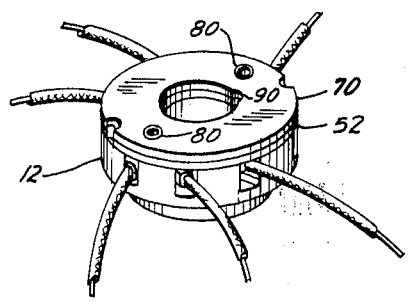
FIG. 1 is a perspective view showing a socket embodying features of my invention, looking toward the outer or back face of the socket.
Figure 2:
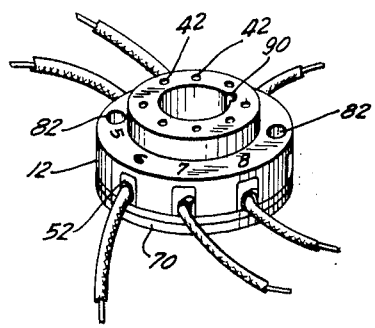
FIG. 2 is a similar view looking toward the inner or front face of the socket.

Reverting now to FIGS. 1, 2, and 3, the particular kinescope socket here disclosed is of the flat type, with connecting wires extending radially outward therefrom. The socket comprises a molded insulation body 12 having a plane outer face 40 (FIG. 3) and a ring of holes 42 (FIG. 2) with channels 44 (FIG. 3) extending outwardly therefrom on said outer face 40. These channels may be radial, but in the present socket slope tangentially or away from true radial direction. The holes are stepped in diameter, as shown in FIGS. 4 and 5, and in FIG. 2 only the small diameter end of the holes are shown.

There is also a ring of metal contacts, only three of which (14, 16, and 18) are shown in FIG. 3. Each contact has a pin grip 46 which is received in the large diameter part of a hole, and a wire clamp 48 which extends outward from the pin grip and which is received in a channel 44. The main part of the wire clamp is clamped directly around the stripped metal end of the wire, which may be and usually is multiple strand wire. However, an auxiliary clamp 50 preferably is provided which is clamped about the insulation of the wire.

A wafer 52 of sheet insulation is secured against the face 40 of body 12 in order to close the slots 44 and thereby to hold the contacts in position. The wafer may have locating notches 51 which receive projections 53 on body 12.

As so far described the construction may be considered a conventional or known construction, but in the present case the wafer 52, instead of being intact like wafer 70, is cut away somewhat at the wire clamp of a plurality of the contacts in order to afford access thereto. In the present case it is cut away at 54 over contact 14, at 56 over contact 16, and at 58 over contact 18. Enough material is left to hold the contacts in position as heretofore.

The present socket further includes a thin metal plate 60, preferably made of brass or other metal which is non-corrosive and a good conductor. It also is preferably resilient. This metal plate is shaped to integrally provide the spring finger 28 which bears resiliently against the contact 18, and the pointed spark gap electrodes 24 and 26 which protectively cooperate with the contacts 14 and 16. The plate 60 is cut away at 62 and at 64 to clear the assembly eyelets described later, and the plate is indented or dimpled at 66 and 68 to be received in holes 70 in wafer 52, to hold these parts against relative rotation. Of course the parts 24, 26 and 28 would additionally serve for this purpose, but not as accurately, and it is preferred to center these parts in the access openings 54, 56 and 58 of wafer 52.

The socket is completed by another insulation wafer 70 disposed outside the metal plate 60. This corresponds to the usual wafer employed in a socket of this type as heretofore made, except that as previously made it would be located at the present location of the wafer 52. The body 12, wafers 52 and 70, and the metal plate 60 are held in assembled relation by a pair of eyelets 72, the heads of which are deeply recessed in the body 12, and the shanks of which pass through diametrically disposed holes 74 in body 12, registering holes 76 in wafer 52, and registering holes 78 in wafer 70, against which the eyelets are riveted or flanged, as shown at 80 in FIG. 1. The deeply recessed holes for the heads of the eyelets are shown at 82 in FIG. 2. The pins of the kinescope tube are shown in broken lines at 84 in FIG. 3. The tube may have a stem 86 with a key 88, in which case the socket has a mating hole, and a keyway shown at 90.

Some details of construction are shown to much larger scale in FIGS. 4 through 7 of the drawing. FIG. 4 is a fragmentary section taken at the grounded contact 18, and shows how the finger 28 of the plate 60 bears resiliently against contact 18 for dependable electrical connection therewith.

FIG. 5 is a similar fragmentary section taken at one of the spark gap electrodes, and shows how the spark gap electrode 24 is bent somewhat toward, but remains spaced from the contact 14. The optimum spacing depends on the desired breakdown voltage, which is kept well above the normal operating voltage for the particular grid of the kinescope, but below the voltage which would injure the kinescope. In the present case the gap is one sixteenth inch, corresponding to a probable breakdown voltage in air of about 2500 volts.

Figure 7:
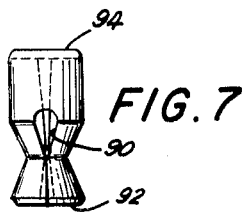
FIG. 7 shows the pin grip of a contact.

FIG. 7 is an end view of the pin grip of one of the contacts, drawn to larger scale, and is intended merely to show how the pin grip portion is divided or slit at 90 to resiliently receive the kinescope pin. The mouth of the pin grip is preferably flared outward, as shown at 92. The connecting portion 94 of the pin grip (see also FIGS. 4 and 5) is bent at right angles, and leads to the wire clamp 48 and the auxiliary clamp 50. The entire contact is made of one piece of metal.

Figure 6:
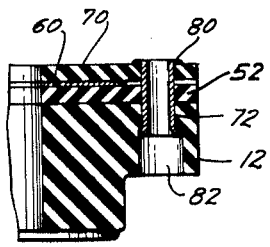
FIG. 6 is a fragmentary section taken at one eyelet.

A fragmentary section taken through one of the eyelets is shown in FIG. 6. The head of the eyelet is recessed in the larger diameter portion 82 of the hole through the body 12. The free end of the eyelet is flanged at 80.

The particular socket here illustrated is intended for use with kinescopes designated commercially as type 19XP4, which is a 19 inch 110 degree tube, and type 23CP4, which is a 23 inch 110 degree tube. The holes in the socket are numbered 1 through 8, and in these particular tubes the ground pin is at #1, and the focusing and accelerator grids which are to be protected by spark gaps are at pins numbered 3 and 4. It will be understood however that if the numbering were different in some other type of kinescope, the only change needed would be in the location of access openings 54, 56 and 58 in wafer 52, and the corresponding spark electrodes 24 and 26 and the ground connecting finger 28 of plate 60.

Although eight contact holes are provided, not all are needed in all cases. Most kinescopes require only six external leads, in which case two contacts and wires are omitted, as here shown. In the case of a cathode ray tube intended for use in an oscilloscope, all eight pins and contacts may be used.

The body 12 is preferably made of a molded phenolic insulation. The wafers 52 and 70 may be stamped out of sheet phenolic insulation. The plate 60 may be stamped out of brass. The contacts and the eyelets are also preferably made of brass. The usual plating with other metals may be used, depending on the requirements of the user.

Another form of the invention may be described with reference to FIGS. 9–13 of the drawing. This form of the invention differs in a number of respects.

Figure 11:
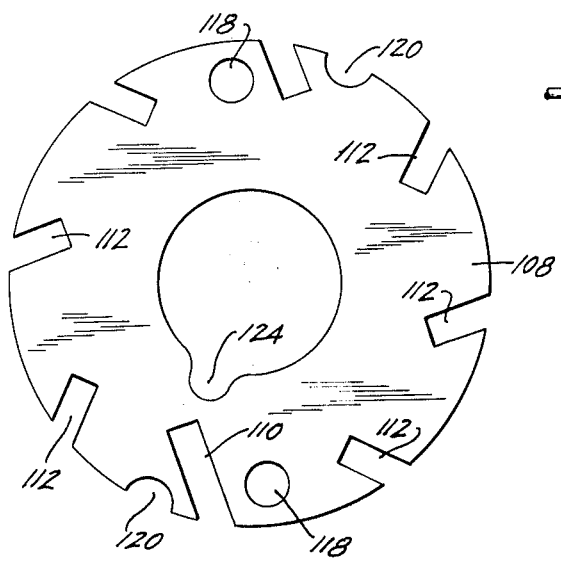
FIG. 11 shows an insulation spacer plate used therewith.

The most obvious and striking difference is that a spark gap is provided for every contact except the grounded contact. This will be clear from inspection of FIG. 9, which shows a metal plate 102 having a curved grounding finger 104, as previously described, and having seven pointed spark gap electrodes 106. The pointed electrodes are at the spacing for eight, the eigth position corresponding to the grounding finger 104. FIG. 11 shows the insulation spacer plate 108 which is interposed between the circle of contacts and the metal plate 102. Plate 108 has one long notch 110 for the grounding finger 104, and it has seven shorter notches 112 for the spark gap electrodes. It will be understood that each point 106 is located over one of the notches 112.

Another difference in the present form of the invention is that the pointed electrodes 106 are not bent toward the contacts. Instead the points 106 are flat and remain in the plane of the metal plate. The length of the spark gap then depends solely on the thickness of the insulation disc 108, and this thickness may be selected to establish a desired breakdown voltage. This is largely determined by the higher voltage contacts, for example, the contact 4 in FIG. 8, which is at 1250 volts. The other contacts carry lower voltages, and therefore no harm is done, and indeed additional protection is afforded, by providing a spark gap for every contact. Of course the very high anode voltage (20,000 volts in FIG. 8), is not connected to the socket at all, and instead is connected to a special high voltage connection on the side of the tube. The letter "C" in FIG. 8 refers to the coating of the tube.

With a spark gap at every contact, the only change needed for different sockets would be a change in the orientation of the grounding finger 104. This may be accommodated by simply rotating the metal plate 102, and the plate is accordingly provided with eight keyways 114, so that the plate can be positioned in any of eight positions. The two assembly eyelets of the socket fit between any of the pointed electrodes. The plate 102 preferably is circularly flanged at 116 to fit within the next insulation plate, thereby centering the metal plate.

Figure 9:
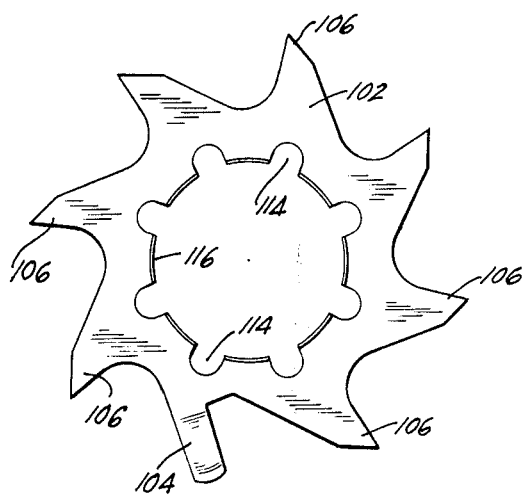
FIG. 9 shows the metal plate used in another form of the invention.

In the case of the insulation plate 108 (FIG. 11) a change in orientation cannot be handled so easily because this plate includes the eyelet holes 118 and it also has external notches 120 which are used when assembling the socket in a mating fixture, that is, to properly register all of the socket parts during the eyeletting operation. The insulation plate 108 therefore is provided with only one keyway 124, instead of eight as in the metal plate 102 (FIG. 9). The small notches 112 are formed in one operation, and the punches are removable, thus making it possible to remove that punch which corresponds to the location of the longer slot 110. The latter is formed in a separate operation in a die which may have eight punches, seven of which are retracted and only one used, or which may have sockets to receive a single punch in any of eight positions.

Figure 13:
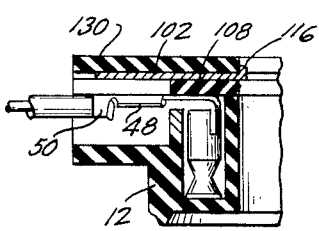
FIG. 13 is a fragmentary section like FIG. 5, but taken through a socket using the plates of FIGS. 9–12.
Figure 12:
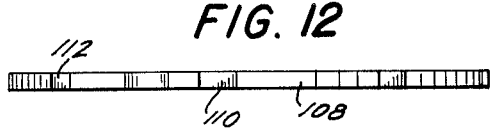
FIG. 12 is an edge view of the latter.

The assembly is shown in FIG. 13, which corresponds to FIG. 5, but which differs in that the pointed electrode 106 remains flat in the plane of the metal plate, instead of being bent downward toward the contact parts 48, 50. The pocket receiving the contact is so dimensioned that the contact is held in position, that is, it cannot move up and down. It will be understood that the top of the contact is larger in area than the notches 112 shown in FIG. 11, so that the insulation plate 108 serves to hold the contacts in their respective pockets.

The complete socket comprises the molded base 12 which receives the contacts, the insulation spacer plate 108, the metal plate 102 with its spark gap electrodes, and an insulation plate 130 which closes the back of the socket. The flange 116 is less in height than the thickness of the back plate 130, and in any case the plate 102 is a grounded element, and therefore is safe.

It is believed that the construction and method of assembly and use of my improved kinescope socket, as well as the advantages thereof, will be apparent from the foregoing detailed description. The only increase in dimension of the socket is an increase in thickness, and this increase is less than 1/16 inch. The spark gaps are self-restoring and may be used repeatedly. No extra wiring is needed.

It will be apparent that while I have shown and decribed the invention in several preferred forms, changes may be made without departing from the scope of the invention as sought to be defined in the following claims.

I claim:

1. A kinescope socket comprising a molded insulation body having a flat outer face and a ring of axially directed holes with channels extending outwardly therefrom on said outer face, a ring of metal contacts each having an axially directed pin grip received in a hole and a wire clamp extending outward from the pin grip and received in a channel, a wafer of sheet insulation against said face to close the channels and thereby to hold the contacts in position, said wafer being cut away somewhat at the wire clamp of a plurality of the contacts to afford access thereto, one of said contacts being for a ground connection, a metal plate outside the aforesaid wafer, another insulation wafer outside the metal plate, and means securing said insulation body and wafers and plate together, said plate having a spring finger bent to bear resiliently against the ground contact, and having a pointed spark gap electrode adjacent another contact for protective cooperation therewith, said spark gap electrode being spaced in axial direction from said adjacent contact.

2. A kinescope socket comprising a molded insulation body having a plane outer face and a ring of axially directed holes with channels extending outwardly therefrom on said outer face, a ring of metal contacts each having an axially directed pin grip received in a hole and a wire clamp extending outward from the pin grip and received in a channel, a wafer of sheet insulation against said face to close the channels and thereby to hold the contacts in position, said wafer being cut away somewhat at the wire clamp of two of the contacts to afford access thereto, one of said contacts being for a ground connection, another being for connection to a focusing grid, a metal plate outside the aforesaid wafer, another insulation wafer outside the metal plate, and means securing said insulation body and wafers and plate together, said plate having a spring finger bent to bear resiliently against the ground contact, and having a pointed spark gap electrode adjacent the focusing grid contact, said spark gap electrode being spaced in axial direction from said focusing grid contact.

3. A kinescope socket comprising a molded insulation body having a plane outer face and a ring of axially directed holes with channels extending outwardly therefrom on said outer face, a ring of metal contacts each having an axially directed pin grip received in a hole and a wire clamp extending outward from the pin grip and received in a channel, a wafer of sheet insulation against said face to close the channels and thereby to hold the contacts in position, said wafer being cut away sowewhat at the wire clamp of two of the contacts to afford access thereto, one of said contacts being for a ground connection, and another being for connection to an accelerator grid, a metal plate outside the aforesaid wafer, another insulation wafer outside the metal plate, and means securing said insulation body and wafers and plate together, said plate having a spring finger bent to bear resiliently against the ground contact, and having a spark gap electrode adjacent the accelerator grid contact.

4. A kinescope socket comprising an insulation body having a ring of axially directed holes with channels extending outwardly therefrom, a ring of metal contacts each having an axially directed pin grip received in a hole and a wire clamp extending outward from the pin grip and received in a channel, a wafer of sheet insulation against said body to close the channel and thereby to hold the contacts in position, said assembled insulation being cut away somewhat at the wire clamps of all of the contacts to afford access thereto, one of said contacts being for a ground connection, a metal plate outside the aforesaid wafer, another insulation wafer outside the metal plate, and means securing said insulation body and wafers and plate together, said plate having a grounding finger bent to bear against the ground contact, and having a ring of pointed spark gap electrodes one each adjacent all of the other contacts for protective cooperation therewith, said spark gap electrodes being spaced in axial direction from the respective adjacent contacts an amount determined by the thickness of the first of said insulation wafers.

5. A kinescope socket comprising an insulation body having a ring of axially directed holes with channels extending outwardly therefrom, a ring of metal contacts each having an axially directed pin grip received in a hole and a wire clamp extending outward from the pin grip and received in a channel, a wafer of sheet insulation against said body to close the channels and thereby to hold the contacts in position, said assembled insulation being cut away somewhat at the wire clamps of all of the contacts to afford access thereto, one of said contacts being for a ground connection, a metal plate outside the aforesaid wafer, another insulation wafer outside the metal plate, and means securing said insulation body and wafers and plate together, said plate having a grounding finger bent to bear against the ground contact, and having a ring of pointed spark gap electrodes one each adjacent all of the other contacts for protective cooperation therewith, said insulation parts having a keyway, and said metal plate having as many keyways as there are contacts, so that the grounding finger may be oriented as desired, said spark gap electrodes being spaced in axial direction from the respective adjacent contacts an amount determined by the thickness of the first of said insulation wafers.

6. A kinescope socket comprising a molded insulation body having a flat outer face and a ring of axially directed holes with channels extending outwardly therefrom on said outer face, a ring of metal contacts each having an axially directed pin grip received in a hole and a wire clamp extending outward from the pin grip and received in a channel, a wafer of sheet insulation against said outer face to close the channels and thereby to hold the contacts in position, said wafer being cut away somewhat at the wire clamps of all of the contacts to afford access thereto, one of said contacts being for a ground connection, a metal plate outside the aforesaid wafer, another insulation wafer outside the metal plate, and eyelets securing said insulation body and wafers and plate together, said plate having a grounding finger bent to bear resiliently against the ground contact, and having a ring of pointed spark gap electrodes one each adjacent all of the contacts for protective cooperation therewith, said spark gap electrodes being spaced in axial direction from the respective adjacent contacts an amount determined by the thickness of the first of said insulation wafers.

7. A kinescope socket comprising a molded insulation body having a flat outer face and a ring of axially directed holes with channels extending outwardly therefrom on said outer face, a ring of metal contacts each having an axially directed pin grip received in a hole and a wire clamp extending outward from the pin grip and received in a channel, a wafer of sheet insulation against said outer face to close the channels and thereby to hold the contacts in position, said wafer being cut away somewhat at the wire clamps of all of the contacts to afford access thereto, one of said contacts being for a ground connection, a metal plate outside the aforesaid wafer, another insulation wafer outside the metal plate, and eyelets securing said insulation body and wafers and plate together, said plate having a grounding finger bent to bear resiliently against the ground contact, and having a ring of pointed spark gap electrodes one each adjacent all of the contacts for protective cooperation therewith, said insulation parts having a keyway, and said metal plate having as many keyways as there are contacts, so that the grounding finger may be oriented as desired, said spark gap electrodes being spaced in axial direction from the respective adjacent contacts an amount determined by the thickness of the first of said insulation wafers.

References Cited by the Examiner
UNITED STATES PATENTS 2,850,714 9/1958 Pace.
2,963,617 12/1960 Gray _____ 315—20

JOHN W. HUCKERT, *Primary Examiner.*

ARTHUR GAUSS, DAVID J. GALVIN, *Examiners.*

R. F. POLISSACK, *Assistant Examiner.*